United States Patent
Nolan et al.

(10) Patent No.: US 7,572,479 B2
(45) Date of Patent: Aug. 11, 2009

(54) METHOD AND APPARATUS FOR EXTRUSION COATING OF FLUORESCENT LIGHT TUBES

(75) Inventors: Robert J. Nolan, Salisbury, NC (US); Mark Cannon, Salisbury, NC (US)

(73) Assignee: Shat-R-Sheild, Salisbury, NC (US)

( * ) Notice: Subject to any disclaimer, the term of this patent is extended or adjusted under 35 U.S.C. 154(b) by 139 days.

(21) Appl. No.: 10/713,614

(22) Filed: Nov. 14, 2003

(65) Prior Publication Data

US 2004/0142100 A1  Jul. 22, 2004

Related U.S. Application Data

(63) Continuation of application No. 10/238,696, filed on Sep. 10, 2002, now abandoned.

(51) Int. Cl.
*B05D 5/12* (2006.01)
(52) U.S. Cl. .......................... 427/67; 427/106
(58) Field of Classification Search .................. 427/67, 427/106
See application file for complete search history.

(56) References Cited

U.S. PATENT DOCUMENTS

| | | | |
|---|---|---|---|
| 2,706,691 A | 4/1955 | Schaefer | 117/33.5 |
| 3,377,494 A | 4/1968 | Repsher | 313/109 |
| 3,453,162 A | 7/1969 | Turner | 156/160 |
| 3,471,317 A | 10/1969 | Clock | 117/94 |
| 3,621,323 A | 11/1971 | Thomas et al. | 313/317 |
| 3,673,401 A | 6/1972 | DuPont | 240/11.4 |
| 3,706,216 A * | 12/1972 | Weingarten | 72/258 |
| 3,798,481 A | 3/1974 | Pollara | 313/110 |
| 3,902,946 A | 9/1975 | Audesse et al. | 156/198 |
| 3,932,048 A | 1/1976 | DuPont | 403/255 |
| 3,947,224 A | 3/1976 | Shaffer | 431/94 |
| 3,959,525 A | 5/1976 | Sentementes et al. | 427/185 |
| 4,048,537 A | 9/1977 | Blaisdell et al. | 313/489 |
| 4,061,461 A | 12/1977 | Hessenthaler | 425/462 |
| 4,065,589 A | 12/1977 | Lenard et al. | 428/35 |
| 4,198,199 A | 4/1980 | Dow et al. | 431/360 |
| 4,332,329 A | 6/1982 | Scriven et al. | 220/2.1 A |
| 4,499,850 A | 2/1985 | Nolan | 118/406 |
| 4,506,189 A | 3/1985 | Nolan | 313/493 |

(Continued)

FOREIGN PATENT DOCUMENTS

| | | |
|---|---|---|
| GB | 0020882.7 | 8/2000 |
| GB | 0026549.6 | 10/2000 |
| WO | WO 02/16049 A1 | 2/2002 |

*Primary Examiner*—Brian K Talbot
(74) *Attorney, Agent, or Firm*—K&L Gates LLP

(57) ABSTRACT

A method and apparatus for coating the glass envelope and portions of the end caps of fluorescent light tubes in a continuous and sequential manner with a thermo-plastic material. The coating is applied by a cross head extruder through which the light tubes are sequentially fed. A vacuum applied during the coating process promotes direct and intimate contact between the coating and the light tubes. The end caps may be heated prior to coating to ensure adherence of the coating to the end caps and not to the glass envelope. Post-coating processes include cooling the coating, severing individual light tubes from the chain of sequentially coated light tubes, and readying the coated light tubes for packaging. The method is automatic, with the apparatus being automatically controlled by a control unit.

38 Claims, 2 Drawing Sheets

U.S. PATENT DOCUMENTS

| | | | |
|---|---|---|---|
| 4,507,332 A | 3/1985 | Nolan et al. | 427/67 |
| 4,633,133 A | 12/1986 | Flaherty | 313/489 |
| 4,804,886 A | 2/1989 | Nolan et al. | 313/489 |
| 4,898,702 A | 2/1990 | Elkins et al. | 264/145 |
| 5,034,650 A | 7/1991 | Nolan | 313/112 |
| 5,043,626 A | 8/1991 | Nolan | 313/489 |
| 5,124,618 A | 6/1992 | Ohtaka et al. | 313/489 |
| 5,173,637 A | 12/1992 | Sica | 131/489 |
| 5,324,885 A | 6/1994 | Koga et al. | 118/657 |
| 5,532,549 A | 7/1996 | Duzyk et al. | 313/489 |
| 5,536,998 A | 7/1996 | Sica | 313/489 |
| 5,945,462 A | 8/1999 | Salamon | 522/37 |
| 6,043,600 A * | 3/2000 | Sica | 313/493 |
| 6,246,167 B1 | 6/2001 | Sica | 131/493 |
| 6,452,325 B1 | 9/2002 | Dupont | 313/489 |
| 2002/0187705 A1* | 12/2002 | Dupont et al. | 445/8 |

* cited by examiner

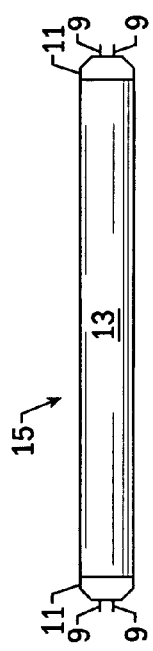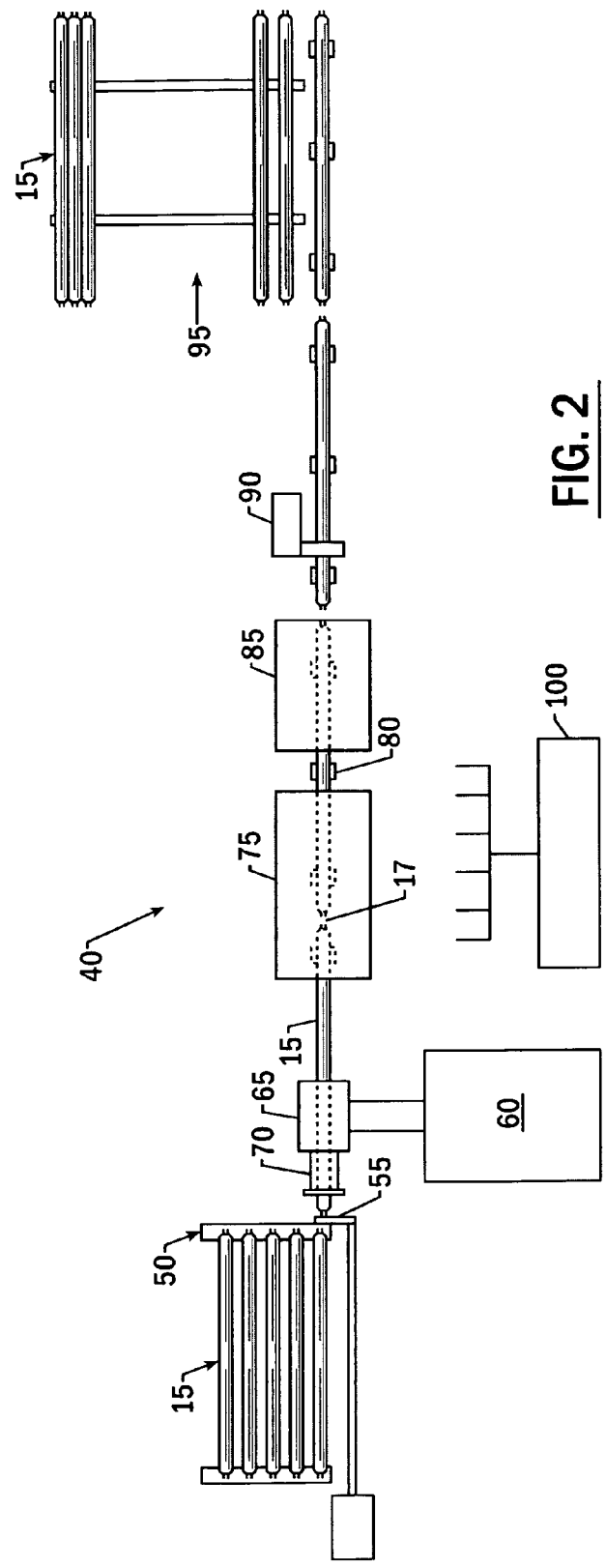

METHOD AND APPARATUS FOR EXTRUSION COATING OF FLUORESCENT LIGHT TUBES

CROSS-REFERENCES TO RELATED APPLICATIONS

The present application is a continuation U.S. patent application claiming priority under 35 U.S.C. §120 from U.S. patent application Ser. No. 10/238,696, filed Sep. 10, 2002, herein incorporated by reference.

FIELD OF INVENTION

The present invention relates to coating fluorescent light tubes with a molten thermo-plastic material to form a plastic sheath or sleeve to contain glass shards in the event the light tube is broken or shattered.

BACKGROUND

A fluorescent light tube includes, among other things, and insofar as pertinent to the present invention, a generally cylindrically shaped glass envelope and end caps provided at either end of the glass envelope. Electrical connecting pins are provided on the end caps to connect the light tube to an electrical power source.

As is known to those skilled in the fluorescent light tube art, a light tube is subject to breakage if dropped or released from any appreciable height or if the light tube is struck by another object. Upon breakage, the glass envelope shatters into numerous glass shards, posing a threat of injury to bystanders or anyone attempting to handle the broken light tube. Thus, there has existed a need to apply a coating to fluorescent light tubes which upon the glass envelope being shattered will maintain the end caps in association with the light tube and contain the glass shards between the end caps.

Providing a protective assembly or coating over the exterior of fluorescent light tubes for protecting the light tubes from impact and for retaining glass fragments and debris are known, for example in U.S. Pat. No. 5,536,998, which utilizes a pre-formed semi-rigid transparent tube surrounding the glass envelope and held in place by heat shrinkable material heat shrunk to a portion of the end caps and extending over the pre-formed tube. The pre-formed protective tube is of sufficient internal diameter to allow a uniform air space to form between the protective tube and the glass envelope. The disadvantage of this process is the need to select two different yet compatible materials and provide a means for forming the uniform air space between the protective tube and the glass envelope.

U.S. Pat. No. 5,532,549 teaches coating light tubes by attaching adapters to the end caps and, using these adapters, rotating the light tubes on the surface of a bath containing the coating material. To ensure complete coverage, the light tube must maintain contact with the surface of the bath throughout the coating process.

U.S. Pat. No. 4,507,332 teaches coating light tubes by exposing the glass envelop and a portion of the end caps to a fluidized bed of powdered polymeric material and heating the light tube above the melting temperature of the polymeric material to melt and fuse the powder onto the glass envelop and end caps to form the coating on the light tube. Heating the entire light tube, though, risks loosening the adhesive attaching the end caps to the glass envelope, thus compromising the integrity of the light tube.

Other methods of coating glass envelops include dipping the envelop in a lacquer coating material (U.S. Pat. No. 3,959,525), and spraying silicone coatings onto glass envelops (U.S. Pat. No. 3,902,946). Although adaptable to "batch" type processing, i.e., applying a coating onto several light tubes at one time, these processes require each light tube be attached to an individual manipulator or adapter before undergoing the coating process, thus making the processes slow.

SUMMARY OF THE INVENTION

The present invention provides a method for coating fluorescent light tubes without the difficulties of previous methods as those discussed above. The fluorescent light tubes comprise, externally, a hollow glass cylinder sealed on each end by metal end caps. The metal end caps act as both a connection to an electrical power supply for the light tube and also to maintain the structural integrity of the light tube. By the present invention, light tubes are fed through an extruder and coated with a molten thermo-plastic material. The thermoplastic material adheres to a portion of the end caps such that when cooled, the coating and end caps form a sealed sheath around the glass envelope. This adherence of the thermoplastic material to the end caps, instead of to the glass envelope, ensures the containment of any glass shards within the sealed sheath if the light tube is broken.

The end caps include electrically conductive pins. These pins generally extend from the end caps in parallel alignment to the longitudinal axis of the glass envelope. The pins are inserted into a light receptacle and conduct electricity from the receptacle to the light tube as well as supporting the light tube within the light receptacle. Thus, the pins must remain free of coating material. When using an extruder to coat the light tubes, three avenues are available to address the need to keep the coating material from contacting the pins: 1) cover the pins during coating; 2) clean the pins after coating; and 3) coat the light tubes in such a manner that prevents the coating from contacting the pins without the need to cover the pins while ensuring that the coating is applied evenly and adheres to the end caps. Covering the pins requires the use of either a disposable cover or a cover capable of being removed, cleaned of the coating material and reused. Further, because the coating is applied to both the light tube and the cover, removing the cover may tear, stretch, or otherwise damage the coating on the light tube, rendering the coating ineffectual. Finally, the covers must be aligned to fit around the pins snugly or else the coating material may seep around the cover and contact the pins. Thus, using a cover to protect the pins is undesirable. Likewise, cleaning the pins after coating is also undesirable because of the risk of damage to the pins and the coating, as well as the time required to ensure each pin is completely free of the coating material. Thus, the desirable choice is to coat the light tubes with an extruder in such a manner as to ensure complete application of the coating material while eliminating the need to protect the pins during the coating process.

Basically, the method of the present invention comprises coating the light tubes with molten thermoplastic material as the light tubes are fed, sequentially, through a cross head extruder. Prior to entering the cross head extruder, the end caps of the light tubes are heated. The pre-heating is performed to ensure that the coating adheres to the end caps and not to the glass cylinder so that, if broken, the end caps and the coating contain all of the glass shards. The light tubes are then conveyed, sequentially and in longitudinal alignment with one another, to the cross head extruder. A coating of molten thermoplastic material is extruded about each light tube. A vacuum is applied in the extruder to evacuate air from between each light tube and the coating to promote direct intimate contract of the coating with each light tube. Gaps are formed between each sequentially fed light tube and these gaps are also coated as the sequential light tubes are fed continuously through the extruder. Upon exiting from the extruder, the chain of now coated light tubes and gaps are cooled to below the softening temperature of the thermoplastic material. After cooling, each light tube is separated from the chain of light tubes. This may be done in a variety of ways either by manual manipulation or by use of an automatic device. The separated light tubes are then conveyed to a finishing station where the end caps of the light tubes may be trimmed of excess coating, labeled, inspected and readied for packaging.

BRIEF DESCRIPTION OF THE DRAWINGS

FIG. 1 is a plan view illustrating one design of a fluorescent light tube.

FIG. 2 is a schematic of the apparatus and method of the present invention.

DETAILED DESCRIPTION OF THE PREFERRED EMBODIMENT

Figure 3:
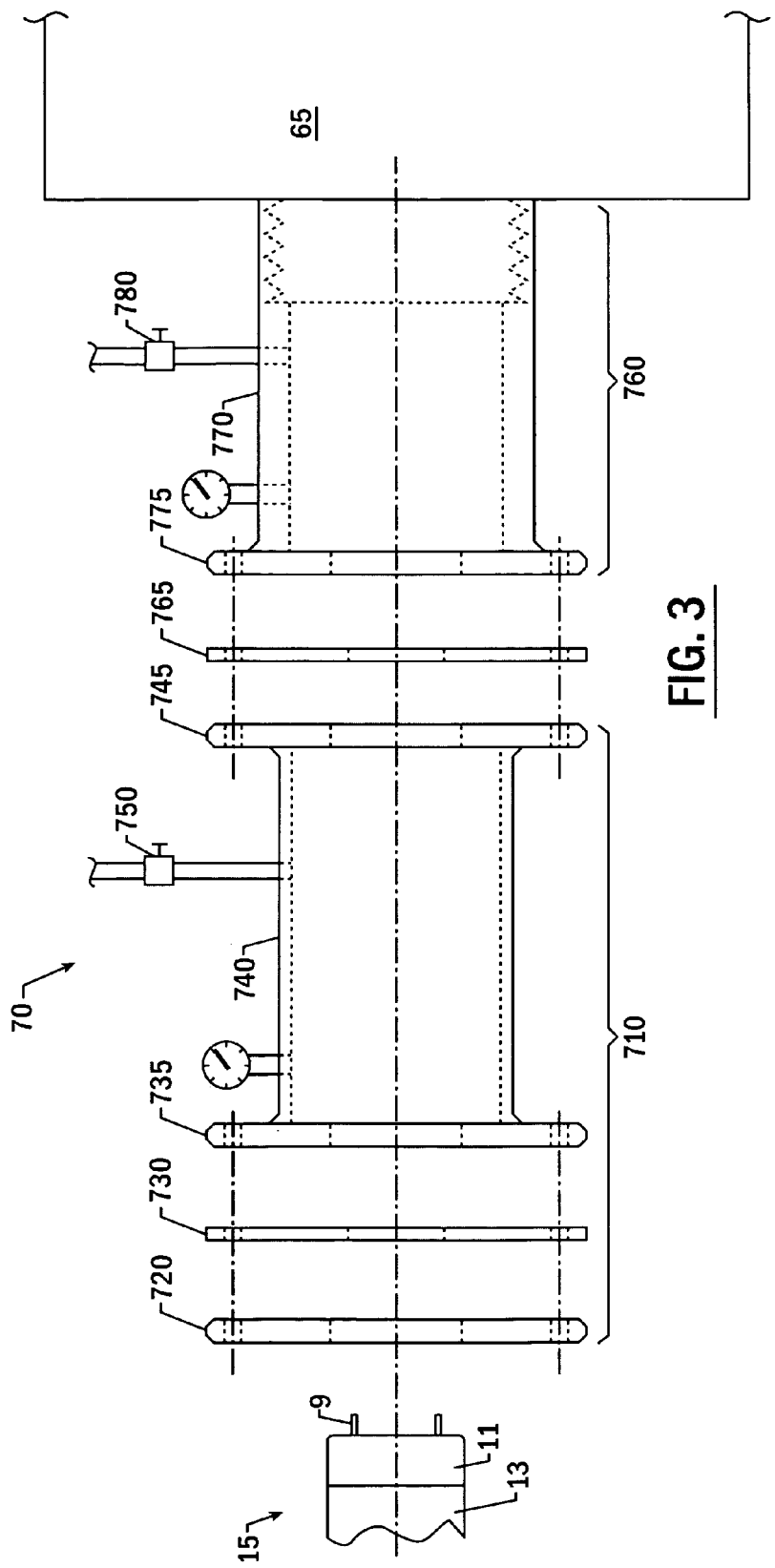
FIG. 3 is an expanded drawing of the vacuum assembly attached to the cross head extruder.

Referring to FIG. 1, and for the purposes of this invention, fluorescent light tubes 15 comprise a glass envelope 13 having end caps 11 attached to opposing ends of the glass envelope 13. Electrically conductive pins 9 extend from at least one end cap 11. Referring to FIG. 2, apparatus 40 for coating light tubes 15 according to the present invention comprises a heating table 50, a cross head extruder 65 with a vacuum assembly 70 attached thereto, and a control unit 100 connected therewith and controlling individual steps of the coating process. Preferably, the apparatus 40 also includes a cooling station 75, a cutting station 85, and a finishing station 95. An entrance conveyor system 55, disposed between the heating table 50 and the cross head extruder 65, impels the light tubes 15 sequentially, in longitudinal alignment with one another from the heating table 50 to the cross head extruder 65. An exit conveyor system 80, disposed between the cooling station 75 and the cutting station 85 further impels the light tubes 15 sequentially to the cutting station 85 after the light tubes 15 have been coated and the coating has been cooled. An accelerating system 90, located after the cutting station 85, conveys the light tubes 15 to the finishing station 95. A passive conveying system maintains the light tubes 15 in proper alignment while traveling through the apparatus 40.

The heating table 50 comprises infra-red panels arranged to heat the end caps 11 of a plurality of light tubes 15. Infrared panels are known by those of the coating art and are used extensively with fluidized bed type coatings. The infra-red panels are preferably controlled by the control unit 100.

Cross head extruders have been used for coating articles that do not have voids or gaps therein, such as wire and cable. A die within the cross head extruder 65 of the present invention conforms to the cross-section of the light tubes 15 and regulates the coating thickness. The cross head extruder 65 is connected to a vacuum hopper loader (not shown) through which is received the thermo-plastic material, typically in pellet form. The thermo-plastic material is plastized in the extruder 60 and applied to the light tubes 15 via the cross head 65. The vacuum assembly 70 attached to the cross head extruder 65 applies a vacuum during extrusion, thus evacuating air from between each light tube 15 and the molten thermoplastic material, thus drawing the molten thermo-plastic material into direct intimate contract with each light tube 15. The vacuum combines with the length of gap 17 between sequential light tubes 15 to prevent the molten thermo-plastic material from contacting the pins 9 on the end caps 11 of the light tubes 15. The vacuum hopper, extruder 60, cross head 65 and vacuum assembly 70 are preferably controlled by the control unit 100.

One embodiment of the vacuum assembly 70 is shown in greater detail in FIG. 3. The vacuum assembly 70 comprises a first vacuum array 710 connected with a second vacuum array 760, which is in direct communication with the cross head extruder 65. The first vacuum array 710 comprises an entrance seal plate 720 attached to an entrance of a vacuum chamber 740. A high temperature seal 730 disposed between the entrance seal plate 720 and the vacuum chamber 740 provides an air tight seal therebetween. A vacuum supply 750, preferably a vacuum pump (not shown) is attached to the vacuum chamber 740. An exit flange 745 of the vacuum chamber 740 of the first vacuum array 710 connects to an entrance flange 775 the second vacuum array 760. A high temperature seal 765 disposed between the exit flange 745 and the entrance flange 775 provides an air tight seal therebetween. The second vacuum array comprises the entrance flange 775 and a vacuum chamber 770 attached to a vacuum supply 780, preferably a vacuum pump (not shown). The vacuum chamber 770 of the second vacuum array 760 is attached to the cross head extruder 65 in a direct, fluid connection. A light tube 15 enters the vacuum assembly 70 through the entrance seal plate 720, travels trough the first vacuum array 710 and the second vacuum array 760, and enters the cross head extruder 65. The vacuum applied in the vacuum assembly 70 evacuates air around the light tube 15, promoting a direct and intimate contact between the light tube 15 and the thermo-plastic material extruded about the light tube 15 within the cross heat 65.

The cooling station 75 cools the coating on the newly coated light tubes 15 and gaps 17 to below the softening temperature of the coating, thus permitting additional manipulation of the light tubes 15 in a timely fashion. The cooling of the coating also prevents the coating from turning opaque, which adversely impacts the brightness of the light tubes while in use. The cooling station 75 comprises a water bath, an air cooling system, or a combination thereof. Preferably, the cooling station 75 comprises a water bath capable of providing a constant supply of chilled water to cool the coating on the light tubes 15. The cooling station 75 may be controlled manually or, preferably, be controlled by the control unit 100.

The cutting station 85 separates individual light tubes 15 from the chain formed by the continuous coating of sequentially fed light tubes 15 by severing the coating encircling the gaps 17 formed between the light tubes 15. The cutting station 85 comprises a cutting tool. The cutting tool comprises a shearing system, hot wire, shears, knives, or a combination thereof, and may be manually or automatically actuated. Preferably, the cutting tool is a shearing system that melts or otherwise slices through the coating encircling the gaps 17. The cutting station 85 is preferably controlled by the control unit 100.

The accelerating system 90 comprises a series of drive wheels operated independently of and at a greater travel rate than the entrance and exit conveying systems 55, 80. The accelerating system 90 provides a burst of speed to the separated light tubes 15, quickly impelling the light tubes 15 to the finishing station 95. The sudden increase in travel rate of the light tubes 15 also ensures that the separation of the light tubes 15 is complete after exiting the cutting station 85. The accelerating system 90 is preferably controlled by the control unit 100.

The finishing station 95 comprises a trimmer tool and a labeling tool. The trimmer tool is used to remove the remnants of the severed coatings encircling the gaps 17 from the end caps 11, thus providing clean edges on the end caps 11 to protect the integrity of the coating adhered to the end caps 11 and to allow the light tubes 15 to be easily fitted into a light receptacle for use. The trimmer tool comprises a hot wire, shears, knives, razors or a combination thereof. The trimmer tool may be manually manipulated or, preferably, controlled by the control unit 100. The labeling tool places a label on the coating and is comprised, preferably of an ink jet type printing system. The labeling tool may be manually or automatically actuated. Preferably, the labeling tool is controlled by the control unit 100.

The entrance and exit conveyor systems 55, 80 comprise a series of indexed drive wheels controlled by the control unit 100. The indexing of the drive wheels is regulated by encoders and servos connected to each of the entrance and exit conveyor systems 55, 80. The entrance and exit conveyor systems 55, 80 are synchronized to ensure a consistent travel rate is maintained for the light tubes 15 undergoing the coating process.

The passive conveyor system (not shown) comprises a series of non-driven wheels spaced along the travel path of the light tubes 15 undergoing the coating process and is used to direct the light tubes 15 on the travel path.

The method of the present invention, utilizing the apparatus 40 discussed above begins by placing a plurality of light tubes 15 upon the heating table 50. The end caps 11 of each of the plurality of light tubes 15 are heated before the plurality of light tubes 15 engage the entrance conveyor system 55. The entrance conveyor system 55 impels the plurality of light tubes 15 sequentially and in longitudinal alignment with one another toward the cross head extruder 65. The sequential light tubes 15 are continuously fed to the cross head extruder 65 by the entrance conveyor system 55. Each light tube 15 is coated with a molten thermo-plastic material while a vacuum is applied to evacuate air from between each light tube 15 and the coating to promote direct intimate contract of the coating with each light tube 15. The sequential feeding of light tubes 15 and the longitudinal alignment thereof creates gaps 17 between each of the light tubes 15. The gaps 17 are also coated as the sequential light tubes 15 are fed continuously through the cross head extruder 65, thus creating a chain of coated light tubes 15 connected by the coated gaps 17. Upon exiting the cross head extruder 65, the coated light tubes 15 and gaps 17 immediately enter the cooling station 75 wherein the light tubes 15 and gaps 17 are passed through a water bath of circulating chilled water, cooling the coating to below the softening temperature of the thermo-plastic material. The exit conveyor system 80 impels the chain of coated light tubes 15 and gaps 17 to the cutting station 85. There, a shearing system severs the coating encircling the gaps 17 between the light tubes 15, thus separating individual light tubes 15 from the chain of coated light tubes 15. The individual light tubes 15 are then quickly moved away from the chain of coated light tubes 15 by the accelerating system 90, which speedily impels the individual coated light tubes 15 to the finishing station 95. At the finishing station 95, the individual coated light tubes 15 are trimmed of excess coating and labeled. The light tubes 15 may then be inspected and readied for packaging.

The coating applied to the light tubes 15 by the cross head extruder 65 is maintained within a desirable thickness range to ensure that the light tubes 15 are completely covered by a consistent thickness of thermoplastic material. The thickness may vary from about 10 mil to about 22 mil, preferably between about 14 mil and about 20 mil, and more preferably between about 16 mil and 18 mil.

The gaps 17 between the sequential light tubes 15 are maintained at a desired length to ensure that each light tube 15 is coated without interference from a preceding or succeeding light tube 15 and to prevent the coating from contacting the pins 9 of the end caps 11 of the light tube 15. The length of the gaps 17 may be regulated by adjusting the travel rate of the light tubes 15 undergoing the coating process. The gaps 17 have a length of between about 0.5 inch and 2.5 inches, preferably between about 1.0 inch and about 2.0 inch, and more preferably about 1.5 inch.

The travel rate of the light tubes 15 is regulated by adjusting the speed of the series of indexed drive wheels of the entrance and exit conveyor systems 55, 80. The travel rate of the light tubes 15 is preferably between about 16 ft/min and 60 ft/min.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A method of coating a chain of at least two fluorescent light tubes, each fluorescent light tube having a transparent or translucent main light body and end caps at the opposite ends of the main light body with the end caps having electrically conductive pins extending from at least one of the end caps, the method comprising the steps:

heating only the end caps of the fluorescent light tubes prior to coating the fluorescent light tubes on a coating conveyor system;

sequentially loading the fluorescent light tubes on the coating conveyor system;

sequentially feeding the fluorescent light tubes at a consistent travel rate with a gap between the fluorescent light tubes to a coating station, which includes a coating machine;

applying a coating to the chain of fluorescent light tubes and the gaps between the fluorescent light tubes with the end caps uncovered at the coating station for direct contact of the coating with the main light body and with the end caps without any other element physically intervening the coating and the end caps while maintaining the gap at a length to prevent the coating from contacting the electrically conductive pins of the end caps of the fluorescent light tubes; and conveying the coated fluorescent light tubes to a stacking and/or packaging station.

2. A method according to claim 1 further comprising removing excess coating from the end caps of the fluorescent light tube.

3. A method according to claim 1, further comprising separating each fluorescent light tube from the chain after the coating step.

4. A method according to claim 1, further comprising cooling the chain after the coating step.

5. A method according to claim 1, further comprising applying a vacuum during the coating step.

6. A method according to claim 1 wherein the coating step further comprises extruding a molten thermo-plastic material.

7. A method for coating a plurality of at least two fluorescent light tubes each fluorescent light tube having a transparent or translucent main light body and end caps at the opposite ends of the main light body with the end caps having electrically conductive pins extending from at least one of the end caps, the method comprising the steps:
    heating only the end caps of the plurality of fluorescent light tubes prior to coating the light tubes;
    conveying the plurality of light tubes sequentially in longitudinal alignment with one another at a consistent travel rate with a gap between the fluorescent light tubes; and
    extruding a coating of molten thermo-plastic material about each light tube and the gap between the light tubes with the end caps uncovered such that the coating is substantially in direct intimate contact with the main light body and with the end caps without any other element physically intervening the coating and the end caps while maintaining the gap at a length to prevent the coating from contacting the electrically conductive pins on the end caps of the light tubes.

8. The method according to claim 7, further comprising cooling the coating below the softening temperature of the thermo-plastic material after the coating step.

9. The method according to claim 7, further comprising applying a vacuum during the extruding step.

10. The method according to claim 7, wherein the step of heating the end caps comprises applying an infra-red heater to the end caps.

11. The method according to claim 8, wherein the step of conveying the plurality of light tubes comprises impelling each light tube in advance of the extruding step and impelling each light tube following the cooling step.

12. The method according to claim 8, wherein the cooling step comprises applying a coolant to the light tubes.

13. The method according to claim 12, wherein the cooling step comprises applying a water bath to the light tubes.

14. The method according to claim 12, wherein the cooling step comprises applying air to the light tubes.

15. The method according to claim 7, wherein the extruding step comprising extruding a continuous coating of molten thermo-plastic material thereby connecting sequentially coated light tubes.

16. The method according to claim 15 further comprising separating the continuous coating between the end caps of sequential light tubes.

17. The method according to claim 16, wherein the separating step comprises applying a cutting tool to the continuous coating between the end caps of sequential light tubes.

18. The method according to claim 16, further comprising accelerating each light tube to effect separation between sequential light tubes.

19. The method according to claim 7, further comprising trimming excess coating from the end caps of the light tubes and labeling the light tubes.

20. The method according the claim 7, further comprising automatically controlling the conveying and feeding steps via a controller.

21. The method according the claim 7, further comprising automatically controlling the heating, conveying, and feeding steps via a controller.

22. The method according the claim 8, further comprising automatically controlling the conveying, feeding, and cooling steps via a controller.

23. The method according the claim 16, further comprises automatically controlling the conveying, feeding, and separating steps via a controller.

24. The method according the claim 18, further comprises automatically controlling the conveying, feeding, separating, and accelerating steps via a controller.

25. The method according the claim 19, further comprises automatically controlling the conveying, feeding, trimming and labeling steps via a controller.

26. The method according to claim 7, wherein the coating step further comprises maintaining a uniform thickness of the molten thermo-plastic material encircling the light tubes to between about 10 mil and about 22 mil.

27. The method according to claim 26, wherein the coating step further comprises maintaining a uniform thickness of the molten thermo-plastic material encircling the light tubes to between about 14 mil and about 20 mil.

28. The method according to claim 26, wherein the coating step further comprises maintaining a uniform thickness of the molten thermo-plastic material encircling the light tubes to between about 16 mil and about 18 mil.

29. The method according to claim 7, wherein the conveying step comprises maintaining a gap between sequential light tubes at a length of between about 0.5 inch and about 2.5 inches.

30. The method according to claim 29, wherein the conveying step comprises maintaining a gap between sequential light tubes at a length of between about 1.0 inch and about 2.0 inches.

31. The method according to claim 29, wherein the conveying step comprises maintaining a gap between sequential light tubes at a length of about 1.5 inch.

32. The method according to claim 7, further comprising the step of adjusting a rate of travel of the light tubes by regulating the conveying step.

33. The method according to claim 32, wherein the adjusting step comprises maintaining the travel rate at between about 16 ft/mm and about 60 ft/mm.

34. A method for coating a plurality of at least two fluorescent light tubes each fluorescent light tube having a transparent or translucent main light body and end caps at the opposite ends of the main light body with the end caps having electrically conductive pins extending from at least one of the end caps, the method comprising the steps:
    a) heating only the end caps of the plurality of light tubes prior to coating the light tubes;
    b) conveying the plurality of light tubes sequentially in longitudinal alignment with one another at a consistent travel rate with a gap between the fluorescent light tubes;
    c) extruding a coating of molten thermo-plastic material about each light tube and the gap between the light tubes with the end caps uncovered while applying a vacuum to evacuate air from between each light tube and the coating to promote direct intimate contact of the coating with the main light body and with the end caps of each light tube without any other element physically intervening the coating and the main light body and the end caps while maintaining the gap at a length to prevent the coating from contacting the electrically conductive pins on the end caps of the light tubes;

d) cooling the coating below the softening temperature of the thermo-plastic material; and e) separating each light tube from the plurality of light tubes.

35. The method according to claim 34, further comprising automatically controlling the heating, conveying, extruding, cooling and separating steps via a controller.

36. The method according to claim 34, further comprising accelerating each light tube after the separating step.

37. The method according to claim 34, further comprising trimming excess coating from each light tube after the separating step.

38. The method according to claim 35, further comprising labeling each light tube.

* * * * *